United States Patent [19]

Nobuoka et al.

[11] Patent Number: 5,473,372

[45] Date of Patent: Dec. 5, 1995

[54] GAMMA CORRECTION CIRCUIT APPROXIMATING NON-LINEAR DIGITAL CONVERSION

[75] Inventors: Kosuke Nobuoka; Tsutomu Fukatsu, both of Yokohama, Japan

[73] Assignee: Canon Kabushiki Kaisha, Tokyo, Japan

[21] Appl. No.: 361,456

[22] Filed: Dec. 21, 1994

Related U.S. Application Data

[63] Continuation of Ser. No. 193,882, Feb. 9, 1994, abandoned, which is a continuation of Ser. No. 851,783, Mar. 16, 1992, abandoned.

[30] Foreign Application Priority Data

Mar. 18, 1991 [JP] Japan ................................... 3-052790

[51] Int. Cl.⁶ .................................................. H04N 5/202
[52] U.S. Cl. ............................................. 348/254; 348/675
[58] Field of Search ..................... 358/32, 164; 348/254, 348/674, 721, 673, 675; H04N 5/202, 9/69

[56] References Cited

U.S. PATENT DOCUMENTS 4,862,270 8/1989 Nishio ................................... 358/164 X 5,208,875 5/1993 Virtue ........................................ 348/721

FOREIGN PATENT DOCUMENTS 0257674 12/1985 Japan .
0266977 11/1987 Japan .
0230873 9/1990 Japan .

*Primary Examiner*—Victor R. Kostak
*Attorney, Agent, or Firm*—Fitzpatrick, Cella, Harper & Scinto

[57] ABSTRACT

A gamma correction circuit for converting N-bit input data into M-bit output data by using a gamma correction curve approximated by a polygonal line having a plurality of straight line sections each having a different slope, the gamma correction circuit including a calculation circuit for executing conversion calculation for each the straight line section; and a control circuit for controlling the calculation circuit in accordance with a value of the input data so that the calculation circuit executes the conversion calculation for each the straight line section corresponding to the value.

9 Claims, 3 Drawing Sheets

① DENOTES FIRST STRAIGHT LINE
② DENOTES SECOND STRAIGHT LINE
③ DENOTES THIRD STRAIGHT LINE
④ DENOTES FOURTH STRAIGHT LINE
⑤ DENOTES FIFTH STRAIGHT LINE

① DENOTES FIRST STRAIGHT LINE
② DENOTES SECOND STRAIGHT LINE
③ DENOTES THIRD STRAIGHT LINE
④ DENOTES FOURTH STRAIGHT LINE
⑤ DENOTES FIFTH STRAIGHT LINE

GAMMA CORRECTION CIRCUIT APPROXIMATING NON-LINEAR DIGITAL CONVERSION

This application is a continuation of application Ser. No. 08/193,882 filed Feb. 9, 1994, now abandoned, which is a continuation of application Ser. No. 07/851,783 filed Mar. 16, 1992, now abandoned.

BACKGROUND OF THE INVENTION

1. Field of the Invention

The present invention relates to a gamma ($\gamma$) correction circuit to be used, for example, with video camera or the like.

2. Related Background Art

Conventionally, a gamma correction curve used by a gamma correction circuit of a video camera is approximated by using a polygonal line which is realized by a diode circuit such as that shown in FIG. 1A. In this circuit, crossover points are determined by voltages E1 to E3, and the slopes of lines are determined by resistors $R_0$ to $R_3$. FIG. 1B shows the gamma correction characteristics realized by the circuit shown in FIG. 1A. $I_1$ represents a current source, and $D_1$ to $D_3$ represent diodes.

The advantage is that this circuit is simple. However, it has a problem that unnecessary distortion is imparted to gamma-corrected signals because the frequency characteristics of the input level changes due to junction capacitance when the diode turns off.

SUMMARY OF THE INVENTION

It is therefore an object of the present invention to provide a gamma correction circuit solving the above problem.

In order to achieve the above object, the embodiments of the present invention provide a gamma correction circuit for converting N-bit input data into M-bit output data by using a gamma correction curve approximated by a polygonal line having a plurality of straight line sections each having a different slope, said gamma correction circuit comprising: calculation means for executing conversion calculations for each said straight line section; and control means for controlling said calculation means in accordance with a value of said input data so that said calculation means executes said conversion calculations for each said straight line section corresponding to said value.

According to the present invention, an input signal is processed in a digital manner to precisely perform gamma correction.

DETAILED DESCRIPTION OF THE PREFERRED EMBODIMENTS

Preferred embodiments of the present invention will be described with reference to the accompanying drawings.

The first embodiment of the present invention will now be described. In this embodiment, the number of input bits is eleven, and the number of output bits is eight. Therefore, the input maximum value is 2047 ($2^{11}-1$), and the output maximum value is 255 ($2^8-1$). Representing these input and output maximum values as 300% and 120% respectively, the values at 100% are 767 and 213, respectively. The coordinate (767, 213) is therefore used as a knee point (reference point). Next, the section between the origin (0, 0) and the knee point (767, 213) is approximated by a polygonal line having first to fourth straight lines. The slope of the first straight line is set to four times the slope 213/767 of a straight line passing through the origin and the knee point, i.e., 852/767~1.1. In order to simplify the circuit, the slope of the first straight line is set to 1. The slopes of the second to fourth straight lines are set to ½, ¼, and ⅛, respectively. The slope of a fifth straight line passing through the knee point (767,213) and the input/output maximum point (2047, 253) is set to 1/32.

Figure 2A:
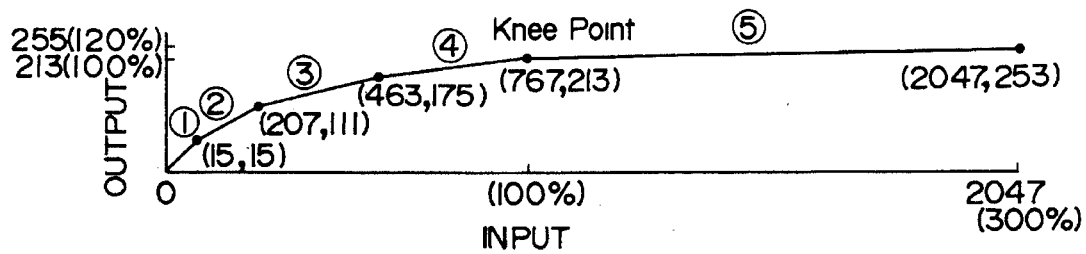
FIG. 2A shows a gamma correction curve according to the present invention.

Each cross point is set to a coordinate represented by a powers of 2 or by a combination of power of numbers, so as also to simplify the circuit. In this manner, a gamma correction curve is substantially and definitely approximated by a polygonal line such as shown in FIG. 2A. Specifically, the first straight line (1) is from a coordinate (0, 0) to (15, 15), the second straight line (2) is from a coordinate (15, 15) to (207, 111), the third straight line is from a coordinate (207, 111) to (463, 175), the fourth straight line is from a coordinate (463, 175) to the knee point (767, 213), and the fifth straight line is from the knee point (767, 213) to (2047, 253). The relation between input x and output y of each straight line is expressed by the following equations:

| | |
|---|---|
| 1st straight line: $y=x$ | (1) |
| 2nd straight line: $y=(x-15)/2+15$ | (2) |
| 3rd straight line: $y=(x-207)/4+111$ | (3) |
| 4th straight line: $y=(x-463)/8+175$ | (4) |
| 5th straight line: $y=(x-767)/32+213$ | (5) |

Figure 2B:
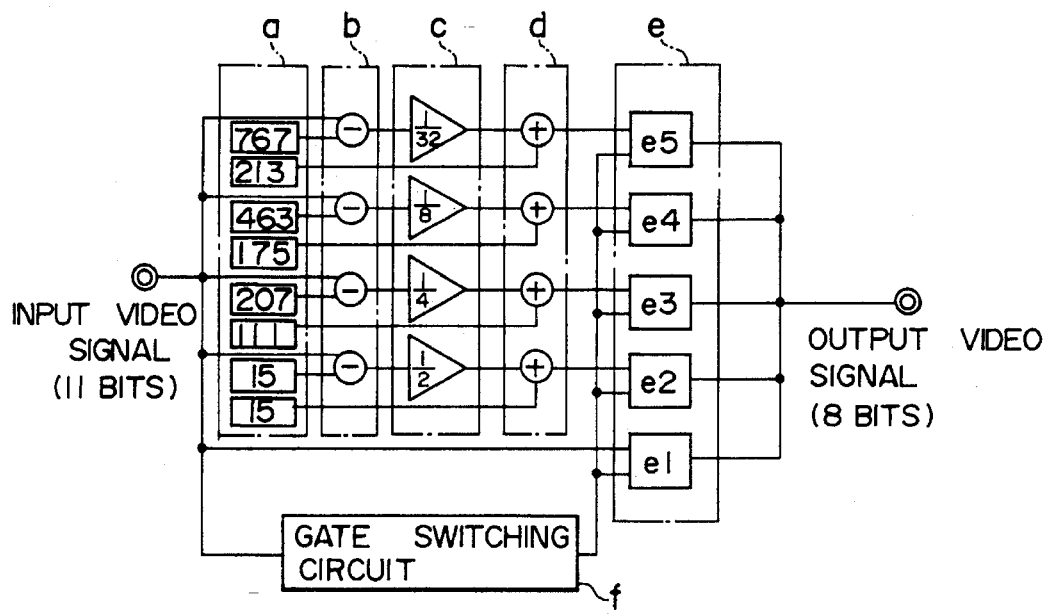
FIG. 2B is a block diagram showing an embodiment of the gamma correction circuit according to the present invention.

FIG. 2B shows a gamma correction circuit having the gamma correction characteristics described above. In FIG. 2B, character a represents a memory for storing a coordinate of each crossover point in the input/output space (numbers in FIG. 2B correspond to coordinate values), character b represents four subtracters, character c represents four constant-multiple circuits (numbers in FIG. 2B correspond to constants in the equations (1) to (5)), character d represents four adders, characters e1 to e5 represent gate circuits (numbers in FIG. 2B correspond to respective first to fifth straight lines), and character f represents a gate switching circuit for turning on one of the five gate circuits in accordance with an input video signal value.

The operation of the circuit will be described below. If an input video signal level is from 0 to 15, only the gate circuit e1 turns on in response to an output from the gate switching circuit f. In this case, the input video signal itself is outputted. This corresponds to the equation (1). Next, if an input video signal level is from 16 to 207, only the gate circuit e2 turns on in response to an output from the gate switching circuit f. In this case, the input video signal is calculated by the equation (2), using data corresponding to the number 15 in the memory a, one subtracter, one ½ constant-multiple circuit, and one adder. The calculated result is outputted from the gate circuit e2. In this case, the input/output relation corresponds to the equation (2). Similarly, if an input video signal is from 208 to 463, from 464 to 767, or from 768 to 2047, the corresponding gate circuit e3, e4, or e5 is turned on to calculate an output value in accordance with the equation (3), (4), or (5). With the above operations, gamma correction using a polygonal line can be executed.

Figure 1A:
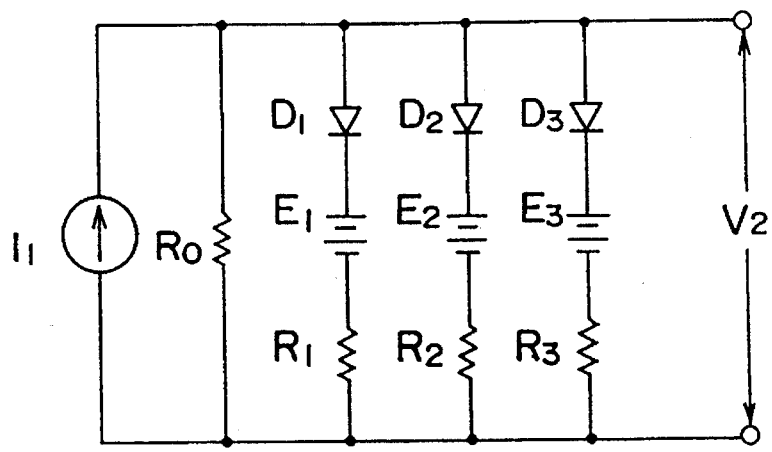
FIG. 1A is a circuit diagram showing a conventional gamma correction circuit.
Figure 1B:
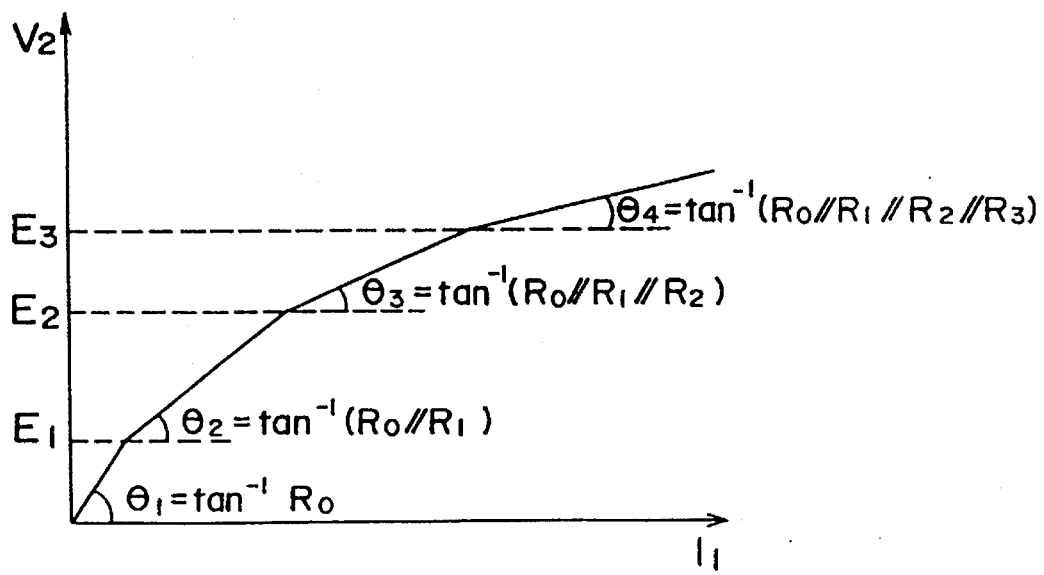
FIG. 1B shows a gamma correction curve used by the circuit shown in FIG. 1A.
Figure 3:
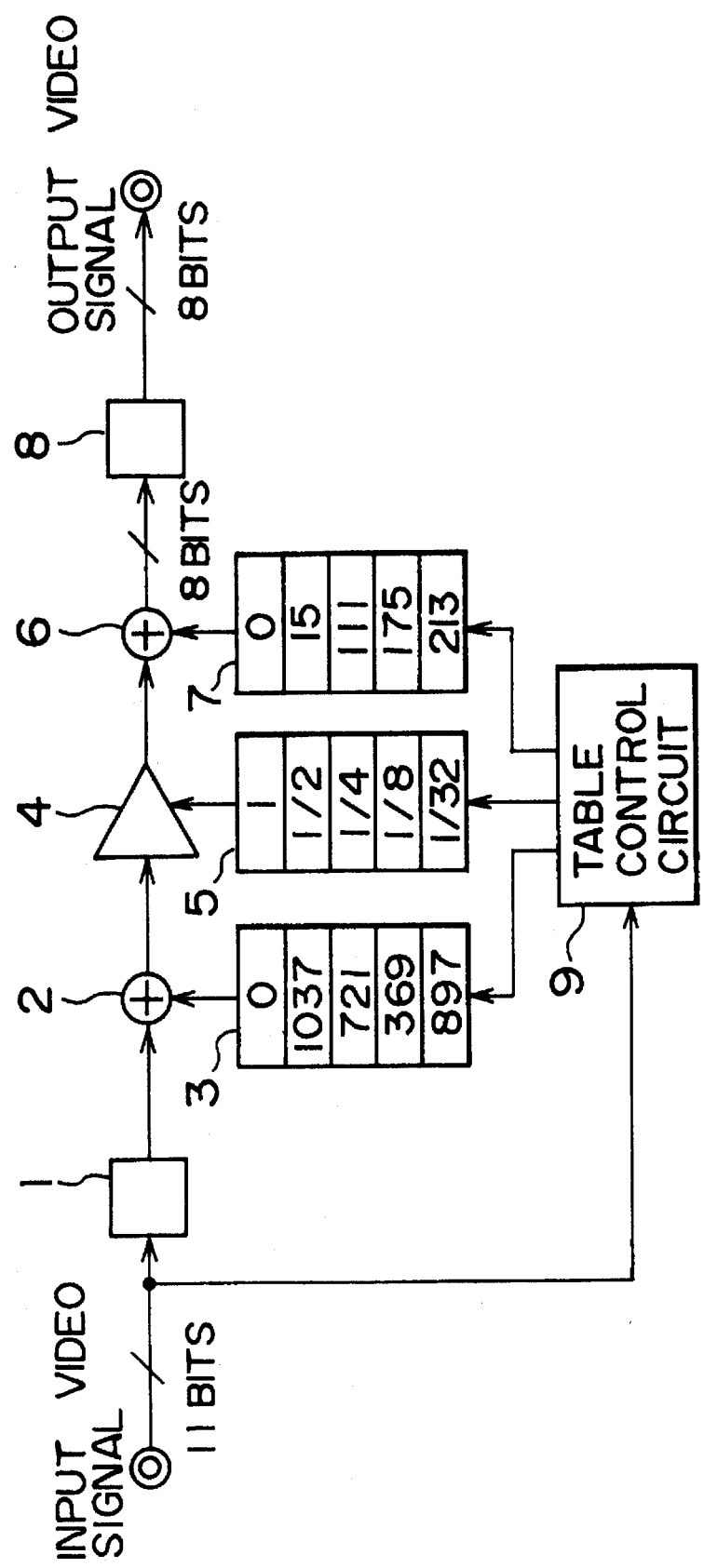
FIG. 3 is a block diagram showing a second embodiment of the present invention.

FIG. 3 shows the second embodiment of the present invention. The gamma correction characteristics of this embodiment are the same as the first embodiment. In FIG. 3, reference numeral 1 represents a 2's complement display converter for inverting the most significant bit of the 11-bit input data. Reference numeral 2 represents an adder. Reference numeral 3 represents a table for storing a 2's complement of a coordinate of each crossover point on the input axis (hereinafter called a crossover point input coordinate). Reference numeral 4 represents a constant-multiple circuit, reference numeral 5 represents a table for storing a gain of the constant-multiple circuit 4, and reference numeral 6 represents an adder. Reference numeral 7 represents a table for storing a coordinate of each crossover point shown in FIG. 1A on an output axis (hereinafter called a crossover point output coordinate). Reference numeral 8 represents a 2's complement display converter for inverting the most significant bit of an 8-bit output data. Reference numeral 9 represents a table control circuit for selecting the values in the tables 3, 5, and 7 in accordance with the input data level, and sets the selected values as the addition data of the adders 2 and 6 and as the gain of the constant-multiple circuit 4.

The operation of the second embodiment of the present invention will be described below. An 11-bit input binary data is converted into 2's complement display data by the 2's complement display converter 1. Next, the adder 2 executes a subtraction operation of values within the parentheses of the first left side terms of the equations (1) to (5) for the first to fifth straight lines. The table 3 stores five types of 2's complements of the crossover point input coordinates which are selected in accordance with the input data level and added to the input data (actually they are subtracted from the input data because they are 2's complements). Selecting the five types of crossover point input coordinates is carried out by the table control circuit 9. If an input data level is from 0 to 15, the table control circuit 9 selects 0 from the table 3 and outputs it to the adder 2. If an input data level is from 16 to 207, the table control circuit selects 1037 (2's complement of 15) from the table 3, and outputs it to the adder 2. Similarly, if the input data level is from 208 to 463, from 464 to 767, or from 768 to 2047, the table control circuit 9 correspondingly selects 721 (2's complement of 207), 369 (2's complement of 463), or 897 (2's complement of 767), and outputs it to the adder 2. The data obtained by subtracting the crossover input coordinate from the input data is multiplied by the slopes of the first to fifth straight lines at the constant-multiple circuit 4. The values of the slopes are being stored in the table 5. If the input data level is from 0 to 15, from 16 to 207, from 208 to 463, from 464 to 767, or from 768 to 2047, the table control circuit 9 correspondingly selects 1, ½, ¼, ⅛, or 1/32, and uses it as the gain of the constant-multiple circuit 4. The constant-multiplied data is then supplied to the adder 6 to be added to the crossover output coordinates which are stored in the table 6. If the input data level is from 0 to 15, from 16 to 207, from 208 to 463, from 464 to 767, or from 768 to 2047, the table control circuit 9 correspondingly selects 0, 15, 111, 175, or 213 and outputs it to the adder 6. Next, the 2's complement data converted by the 2's complement display converter 8 is converted into original binary data, and the lower eight bits only are outputted as the gamma corrected 8-bit video signal.

As described above, according to the present embodiments, it is possible to suppress a change in the gamma correction characteristics influenced by the performance of circuit elements, which might otherwise be associated with a conventional gamma correction circuit made of diodes, resistors and the like. Furthermore, setting a knee point to 100% point within the input/output dynamic ranges of 300% and 120%, a gamma correction curve is approximated by a polygonal line including four straight lines between the origin and the knee point whose slopes are about four-, two-, one-, and one second-folds of the slope of a straight line passing through the origin and the knee point, and one straight line after the knee point whose slope is about one eighth-fold, thereby realizing a good gamma correction with a simple circuit structure.

What is claimed is:

1. A gamma correction circuit for converting N-bit digital input data into M-bit output data by using a gamma correction curve approximated by a polygonal line having a plurality of straight line sections each having a different slope, said gamma correction circuit comprising:

calculation means for executing a conversion calculation for each said straight line section, said calculation means including a plurality of channels of calculation circuits for performing the conversion calculations, one channel for each said straight line section, and each said calculation circuit including at least a constant-multiple circuit, an adder, a subtracter, and storage means for storing addition data and subtraction data obtained by said adder and said subtracter; and control means for controlling said calculation means in accordance with a value of said input data so that said calculation means executes said conversion calculation for each said straight line section corresponding to said input data value, said control means including gate means for selecting and outputting one of the outputs of said plurality of calculation circuits in accordance with the value of said input data.

2. A gamma correction circuit according to claim 1, wherein setting a reference point to an input/output 100% point within the input/output maximum: values $2^N-1$ and $2^M-1$ defined as 300% and 120% respectively, said gamma correction curve is approximated by a polygonal line including four straight lines between the origin and said reference point whose slopes are about four-, two-, one-, and one half-folds of the slope of a straight line passing through the origin and said reference point, and one straight line within the input/output range over said reference point whose slope is about one eighth-fold.

3. A gamma correction circuit according to claim 1, wherein said control means includes a look-up table for storing data to be used for said calculation by said calculation means.

4. A non-linear conversion circuit, comprising:

(a) input means for inputting an N-bit digital signal;

(b) a plurality of conversion means for converting the input digital signal using a predetermined conversion characteristic, each of said plurality of conversion means including at least a constant-multiple circuit, an adder, a subtracter, and storage means for storing addition data and subtraction data obtained by said adder and said subtracter; and (c) selection means for selecting a plurality of output signals of said plurality of conversion means, according to an input level of the digital signal.

5. A circuit according to claim 4, wherein said plurality of conversion means forms a gamma correction curve approximated by a polygonal line having a plurality of straight line sections.

6. A circuit according to claim 4, wherein setting a reference point to an input/output 100% point within the input/output maximum values $2^N-1$ and $2^M-1$ defined as 300% and 120% respectively, said gamma correction curve is approximated by a polygonal line including four straight lines between the origin and said reference point whose slopes are about four-, two-, one-, and one half-folds of the slope of a straight line passing through the origin and said reference point, and one straight line within the input/output range over said reference point whose slope is about one eighth-fold.

7. A signal conversion apparatus comprising:

input means for inputting a digital signal;

conversion means for converting the input digital signal by performing an operation using the input digital signal and a predetermined coefficient, and for outputting the converted signal, said conversion means including at least a constant-multiple circuit, an adder for providing addition data, a subtracter for providing subtraction data, and storage means for storing the addition data and subtraction data provided by said adder and said subtracter, respectively;

memory means for storing predetermined data relating to said predetermined coefficient; and setting means for setting predetermined data stored in said memory means into said conversion means in accordance with a characteristic of the input digital signal.

8. Apparatus according to claim 7, wherein said conversion means forms a gamma correction curve approximated by a polygonal line having a plurality of straight line sections.

9. Apparatus according to claim 7, wherein, setting a reference point to an input/output 100% point within the input/output maximum values $2^N-1$ and $2^M-1$ defined as 300% and 120% respectively, said gamma correction curve is approximated by a polygonal line including four straight line sections between the origin and said reference point whose respective slopes are substantially four, two, one, and one-half folds of the slope of a straight line passing through the origin and said reference point, and one straight line section within the input/output range over said reference point whose slope is substantially one-eighth fold.

* * * * *

UNITED STATES PATENT AND TRADEMARK OFFICE
CERTIFICATE OF CORRECTION

PATENT NO. : 5,473,372
DATED : December 5, 1995
INVENTOR(S) : KOSUKE NOBUOKA, et al.

It is certified that error appears in the above-indentified patent and that said Letters Patent is hereby corrected as shown below:

ON THE COVER PAGE item [57] ABSTRACT

Line 6, "each the" should read --each--.
　　Line 10, "each the" should read --each--.

COLUMN 2

Line 25, "powers" should read --power--; and "power" should read --powers--.

COLUMN 4

Line 45, "maximum:" should read --maximum--.

Signed and Sealed this

Ninth Day of April, 1996

Attest:

BRUCE LEHMAN

Attesting Officer　　Commissioner of Patents and Trademarks